US008224689B1

(12) United States Patent
Sandberg et al.

(10) Patent No.: US 8,224,689 B1
(45) Date of Patent: Jul. 17, 2012

(54) ESTIMATING INVENTORY, USER BEHAVIOR, AND/OR COST AND PRESENTATION ATTRIBUTES FOR AN ADVERTISEMENT FOR USE WITH AN ADVERTISING SYSTEM

(75) Inventors: Magnus Sandberg, Uppsala (SE); Eric Veach, Mountain View, CA (US); Zhe Qian, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/037,227

(22) Filed: Feb. 28, 2011

Related U.S. Application Data

(63) Continuation of application No. 10/350,911, filed on Jan. 24, 2003, now abandoned.

(60) Provisional application No. 60/439,354, filed on Jan. 10, 2003.

(51) Int. Cl.
*G06Q 30/02* (2012.01)
(52) U.S. Cl. ..................................... 705/7.35; 705/14.42
(58) Field of Classification Search ................ 705/7.35, 705/14.42; 707/999.002, 999.003
See application file for complete search history.

(56) References Cited

U.S. PATENT DOCUMENTS

| | | | | |
|---|---|---|---|---|
| 6,161,112 A | * | 12/2000 | Cragun et al. ................. | 715/251 |
| 6,269,361 B1 | * | 7/2001 | Davis et al. ........................... | 1/1 |
| 6,285,999 B1 | | 9/2001 | Page | |
| 7,016,892 B1 | | 3/2006 | Kokkonen et al. | |
| 7,555,485 B2 | * | 6/2009 | Soulanille ............................ | 1/1 |
| 7,627,515 B2 | * | 12/2009 | Borgs et al. ..................... | 705/37 |
| 7,630,986 B1 | * | 12/2009 | Herz et al. ............................ | 1/1 |
| 7,778,872 B2 | | 8/2010 | Kamangar et al. | |
| 2002/0169760 A1 | | 11/2002 | Cheung et al. | |
| 2003/0050863 A1 | | 3/2003 | Radwin | |
| 2003/0055729 A1 | | 3/2003 | Bezos et al. | |

OTHER PUBLICATIONS

"Marketing Dollars and Sense to Kids and Teens via Financial Websites", Youth Markets Alert, v 7, n 1, Jan. 2000.*
Sergey Brin and Lawrence Page, "The Anatomy of a Large-Scale Hypertextual Search Engine," 1998, Seventh International World Wide Web Conference, Brisbane, Australia, 20 pages.
Manning et al., "Methods and Apparatus for Ordering Advertisements Based on Performance Information", U.S. Appl. No. 10/112,656, filed Mar. 29, 2002, 25 pages.
Veach, "Estimating User Behavior and Using Such Estimates", U.S. Appl. No. 10/350,910, filed Jan. 24, 2003, 33 pages.

* cited by examiner

*Primary Examiner* — Donald L. Champagne
(74) *Attorney, Agent, or Firm* — Fish & Richardson P.C.

(57) ABSTRACT

An advertiser may be provided with fast and accurate estimates of the future performance of at least one of their advertisements. These estimates may be broken down by keyword, thereby providing, up-front, useful information to the advertiser about how different keywords will affect the performance and cost of their ad campaign. Estimates and/or suggestions for a set of keywords, given additional campaign parameters, may be generated by using historical search traffic (or some other ad serving trigger) data to predict future inventory and to find useful keyword (or some other serving constraint) variations. Current data on competing ads may be used to simulate the competitions (e.g., real-time auctions) that the given ads will participate in.

24 Claims, 8 Drawing Sheets

ESTIMATING INVENTORY, USER BEHAVIOR, AND/OR COST AND PRESENTATION ATTRIBUTES FOR AN ADVERTISEMENT FOR USE WITH AN ADVERTISING SYSTEM

§0. RELATED APPLICATION

This application is a continuation and claims the benefit of priority under 35 U.S.C. §120 of U.S. application Ser. No. 10/350,911, filed on Jan. 24, 2003, which claims priority under 35 U.S.C. §119(e)(1), to provisional patent application Ser. No. 60/439,354, filed on Jan. 10, 2003. The disclosure of each prior application is considered part of and is incorporated by reference in the disclosure of this application.

§1. BACKGROUND OF THE INVENTION

§1.1 Field of the Invention

The present invention concerns advertising. In particular, the present invention concerns estimating costs and performances associated with a candidate ad, and using such estimates to help advertisers.

§1.2 RELATED ART

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com," which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Generally, advertisers would like to know about how their online advertising is performing. In fact, advertisers would like to be able to predict costs and performance associated with one or more candidate ads.

§2. SUMMARY OF THE INVENTION

An advertiser may be provided with fast and accurate estimates of the future performance of at least one of their advertisements. For example, in an online advertising system in which the serving of ads can be targeted based on serving constraints, such as a set of keywords and perhaps a geographic area and/or a set of languages, and in which the serving of ads is based, at least in part, on a cost per result (e.g., cost per clickthrough) bid, an advertiser may be provided with estimates of (i) how many clicks per time period (e.g., per day) their ad will get, (ii) what presentation attribute (e.g., position) the ad will have, and (iii) what the resulting cost over the time period (e.g., a day) will be. These estimates may be broken down by keyword, thereby providing, up-front, useful information to the advertiser about how different keywords will affect the performance and cost of their ad campaign. Estimates and/or suggestions for a set of keywords, given additional campaign parameters, may be generated by using historical search traffic (or some other ad serving trigger) data to predict future inventory and to find useful keyword (or some other serving constraint) variations. Current data on competing ads may be used to simulate the competitions (e.g., real-time auctions) that the given ads will participate in.

§4. DETAILED DESCRIPTION

The present invention may involve novel methods, apparatus, message formats and/or data structures for determining cost and performance estimates of an advertisement. Such estimates may help an advertiser make more informed decisions about an ad or an ad campaign. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which the present invention may operate are described in §4.1. Then, exemplary embodiments of the present invention are described in §4.2. Finally, some conclusions regarding the present invention are set forth in §4.3.

§4.1 Environments in which, or with which, the Present Invention May Operate

§4.1.1 Exemplary Advertising Environment

Figure 1:
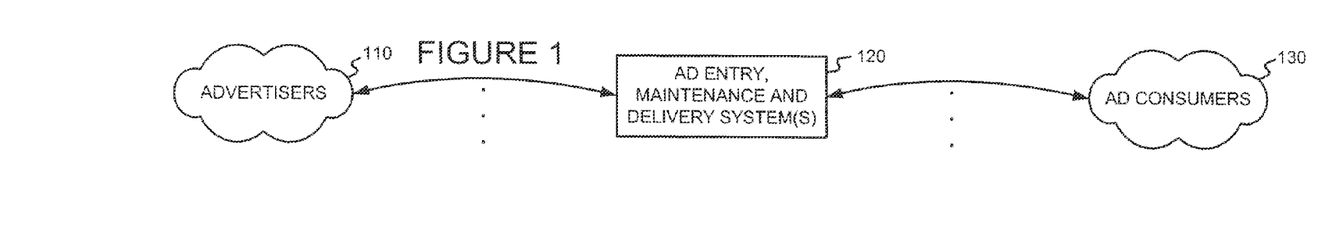
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

Figure 2:
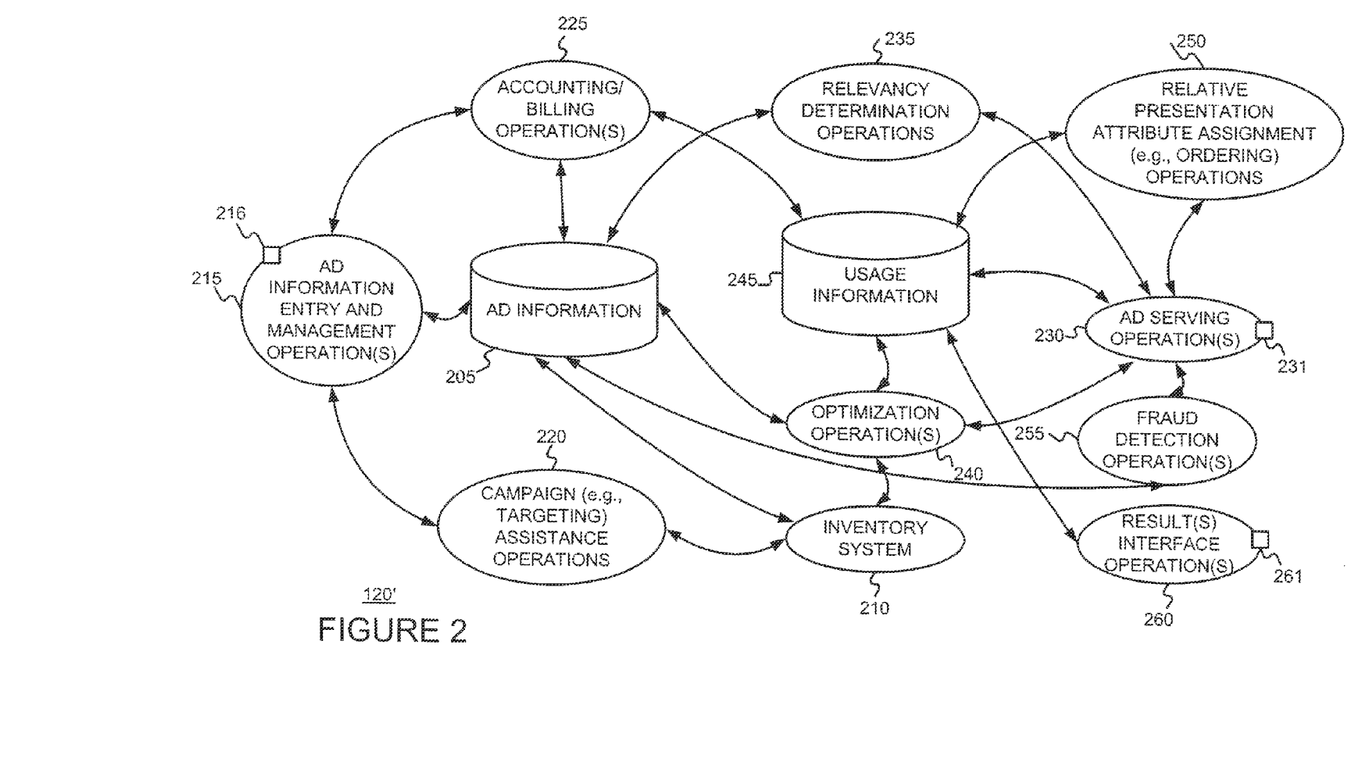
FIG. 2 is a bubble chart of an exemplary advertising environment in which, or with which, the present invention may operate.

FIG. 2 illustrates an exemplary ad system 120', consistent with principles of the present invention. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§4.1.3 Definitions

Online ads, such as those used in the exemplary systems described above with reference to FIGS. 1 and 2, or any other online advertising system, may have various intrinsic features. Such features may be specified by an application and/or an advertiser. These features may be referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When ad online ad is served, one or more parameters may be used to describe how, when, and/or where the ad was served. These parameters may be referred to as "serving parameters" below. Serving parameters may include, for example, one or more of the following: features of a page on which the ad was served, a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad was served in response to, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters may be referred to simply as "serving constraints." For example, in some systems, an advertiser may be able to specify that its ad is only to be served on weekdays, no lower than a certain position, only to users in a certain location, etc. As another example, in some systems, ad advertiser may specify that its ad is to be served only if a page or search query includes certain words or phrases (referred to as "keywords").

User behavior can be any type of user behavior. However, the present invention is more useful if the user behavior is measurable or observable, and if the user behavior is one responsive to a served ad. Thus, for example, the present invention is more useful if the user behavior is a behavior such as a selection (e.g., a click-through), a selection rate (e.g., a click-through rate), stay time (the amount of time a user spends at a destination Web site) a conversion, a conversion rate, a referral to another party, etc. User behavior is normally a function of one or more ad features and/or one or more serving parameters.

Various exemplary embodiment of the invention are now described in §4.2.

§4.2 Exemplary Embodiments

Many of the following exemplary embodiments are described with respect to an online advertising system used by a search facility that provides search results in response to queries, such as the one described above in §4.1 for example. In the exemplary online advertising system, advertisements have one or more associated keywords, typically defined by the advertiser. The advertisements may be served, perhaps subject to conditions and/or competition with other advertisements, if one or more of its keywords has a predefined relationship (e.g., a match) with terms or phrases of a query. In the exemplary embodiment, a performance parameter may be described as a clickthrough rate, or a conversion rate. Ads may vie for position on a search results page. The relative position of competing ads is described as being a function of a bid and/or a performance parameter.

Although many of the exemplary embodiments are described in the context of the foregoing online advertising system, the invention is not to be limited to such a system, and can be used with different systems. For example, an ad may be served in response to any ad serving trigger, not necessarily a search query. Accordingly, the invention may be used in many online contexts, not necessarily a search engine Web site. A keyword or keywords associated with an ad may be thought of more generally as a serving constraint. A relative position may be thought of more generally as a presentation attribute. A clickthrough rate or conversion rate may be thought of more generally as a user behavior, typically a user behavior responsive to a served ad. Any specific time periods described below can be thought of more generally as a relevant time period.

§4.2.1 General Operations

The present invention may be used to provide an advertiser with fast and accurate estimates on the future performance and costs of at least one of their advertisements. For example, in an online advertising system in which the serving of ads can be targeted based on serving constraints, such as a set of keywords and perhaps a geographic area and/or a set of languages, and in which the serving of ads is based, at least in part, on a cost per result (e.g., cost per clickthrough) bid, many advertisers would like to know, among other things, (i) how many clicks per time period (e.g., per day) their ad will get, (ii) what presentation attribute (e.g., position) the ad will have, and (iii) what the resulting cost over the time period (e.g., a day) will be. To answer this need, a system consistent with the present invention may determine and render (per ad or perhaps per ad group, depending on how ads are served) the average daily number of clicks, the average ad position, and the average daily cost that the ad campaign will incur. It may be useful to the advertiser if these estimates are broken down by keyword, thereby providing, up-front, useful information to the advertiser about how different keywords will affect the performance and cost of their ad campaign.

The present invention may also be used to suggest potential keywords for the advertiser to use, based on an initial set of keywords (a "seed"), that the advertiser may choose to add to their campaign targeting. In this context, as with any candidate keyword, the present invention may be used to estimate performance and cost of an ad or ads based on suggested keywords.

Thus, the present invention may be used to generate estimates and/or suggestions for a set of keywords, given additional campaign parameters. It may do so by using historical search traffic (or some other ad serving trigger) data to predict future inventory and to find useful keyword (or some other serving constraint) variations. The present invention may then use current data on competing ads to simulate the competitions (e.g., real-time auctions) that the given ads will participate in.

Various refinements (e.g., to algorithms and/or data structures) of the present invention allow it to use data that is current as of the moment of the request and, moreover, allow it to do so fast (response times of at most a few seconds). If such refinements, potentially or actually, sacrifice the quality of the result, the advertiser can elect to disable at least some of these refinements to use more thorough computations to get better results.

Figure 3:
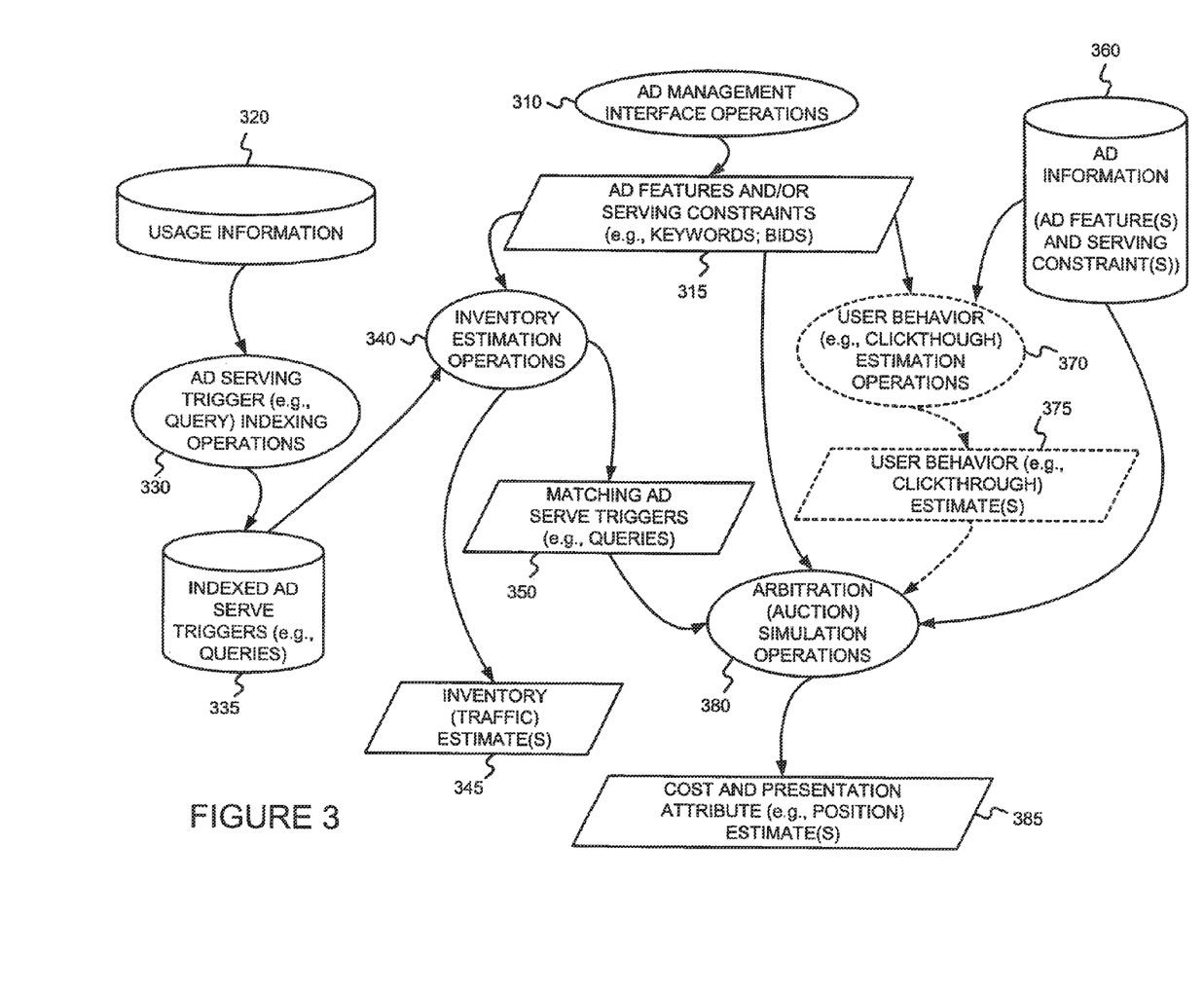
FIG. 3 is a bubble chart of operations that may be used to generate inventory estimates, user behavior estimates, and costs and presentation attribute estimates for an online ad, in a manner consistent with the present invention.
Figure 4:
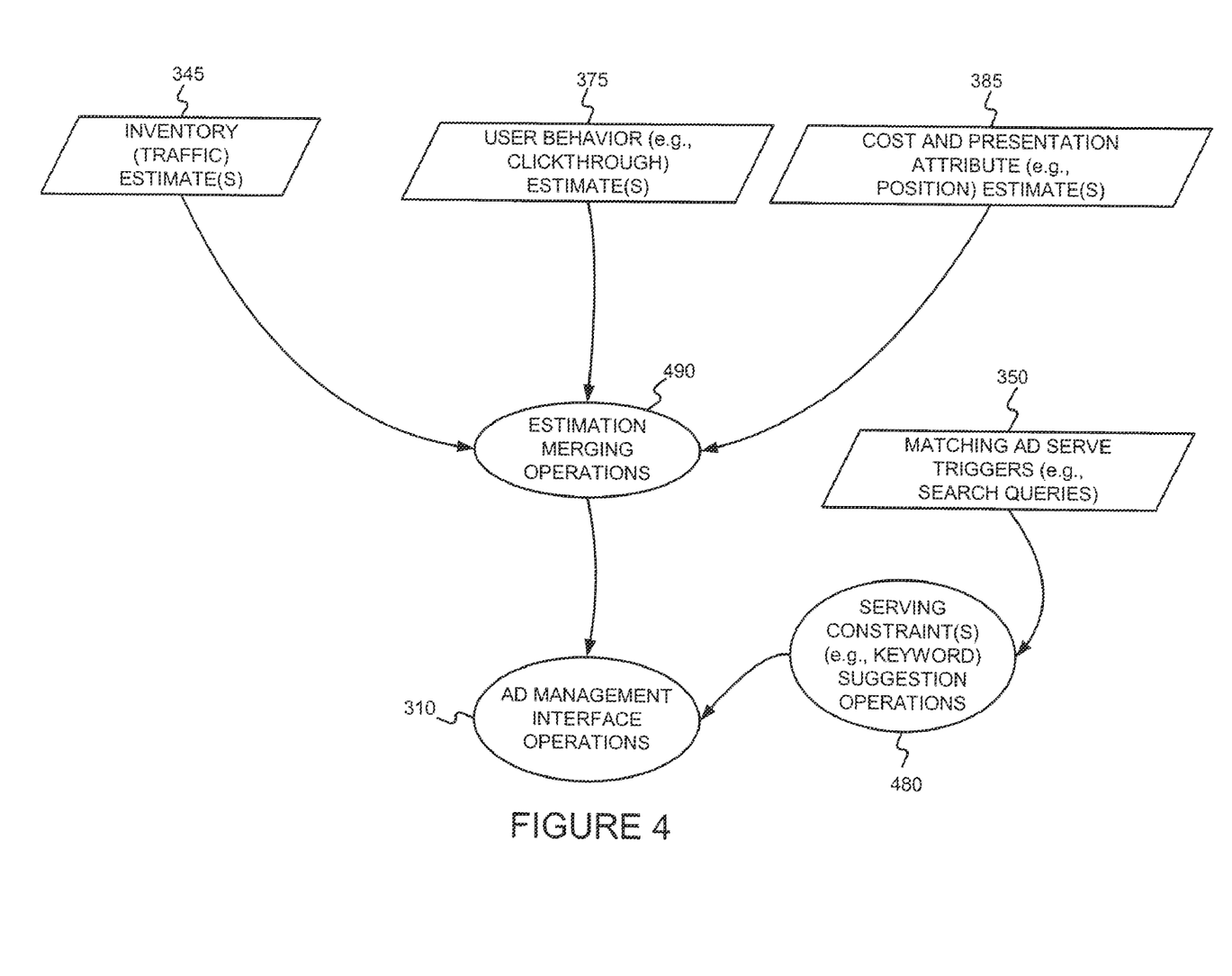
FIG. 4 is a bubble chart of operations that may use the various estimates and intermediate data generated by the operations of FIG. 3, consistent with the present invention.

FIGS. 3 and 4 are bubble charts of operations that may be performed on data, consistent with the present invention. As shown in FIG. 3, ad management interface operations 310 may be used to generate ad features (e.g., bids) and/or serving constraints (e.g., keywords) 315. For example, these operations 310 may prompt and accept advertiser input. In the context of an ad serving system such as the one 120' of FIG. 2, the ad management interface operations 310 could correspond to ad information entry and management operations 215. The ad features and serving constraint information 315 and, preferably indexed ad serve triggers (e.g., search queries) 335 may be used by inventory estimation operations 340 to determine inventory estimates 345, as well as ad serve triggers (e.g., search queries) corresponding to (e.g., matching) the ad features and serving constraints 350. Various exemplary inventory estimation techniques are described in §4.2.2 below. As shown in FIG. 3, ad serving trigger (e.g., search query) indexing operations 330 may be used to generate the indexed ad serve triggers (e.g., search queries) 335 from usage information 320. Various exemplary ad serving trigger indexing techniques are described in §4.2.2 below.

Still referring to FIG. 3, user behavior estimation operations 370 may use the ad features and serving constraints 315, as well as ad information 360, such as information about other ads, to generate user behavior estimate(s) 375. Various exemplary user behavior estimation techniques are described in §4.2.3 below.

Ad arbitration (e.g., auction) simulation operations 380 may use the ad features and serving constraints 315, matching ad serve triggers 350, and, in some cases, user behavior estimate(s) 375 to simulate a number of competitions, such as auctions, among the candidate ad and other ads, and to generate composite (e.g., average) cost and presentation attribute (e.g., position) estimates 385.

Referring now to FIG. 4, estimation merging operations 490 may use inventory estimate(s) 345, user behavior estimate(s) 375, and cost and presentation attribute estimate(s), to present meaningful information to an advertiser via the ad management interface operations 310. Also, serving constraint (e.g., keyword) suggestion operations 480 may use matching ad serve triggers (e.g., search queries) 350 to suggest serving constraints (e.g., keywords) to the advertiser via the ad management interface operations 310. In the context of an ad serving system such as the one 120' of FIG. 2, the serving constraint(s) suggestion operations 480 could correspond to campaign assistance operations 220.

Figure 5:
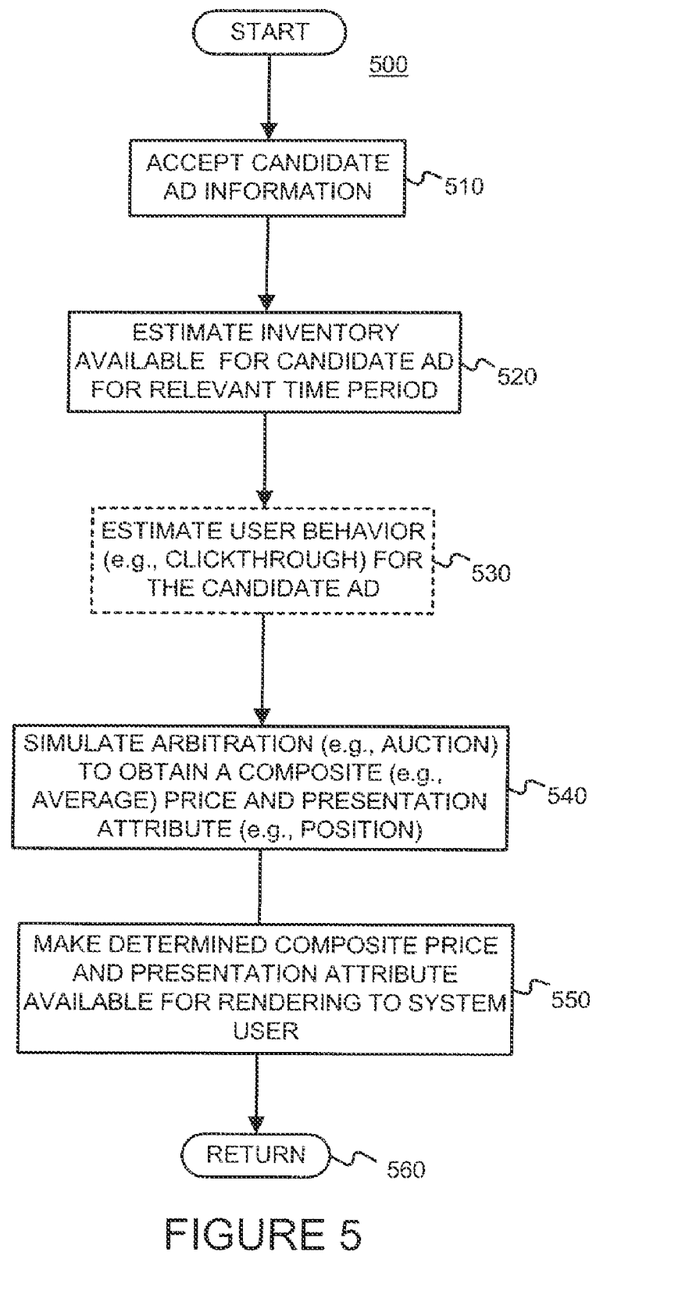
FIG. 5 is a flow diagram of a general exemplary method that may be used to perform various operations in a manner consistent with the present invention.

FIG. 5 is a flow diagram of an exemplary general method 500 that may be used to perform various operations in a manner consistent with the present invention. As shown, candidate ad information, such as ad features and/or serving constraints, is accepted. (Block 510) Inventory for the candidate ad for a relevant time period is then estimated. (Block 520) In one embodiment of the invention, user behavior (e.g., clickthrough) with respect to the candidate ad is then estimated. (Block 530) As will be explained below, such a user behavior estimation is not needed in some embodiments, and therefore need not be determined in such cases. Since the candidate ad will presumably be competing with other ads, one or more arbitrations (e.g., auctions) are simulated and composite (e.g., average) cost and presentation attribute values may be obtained. (Block 540) In some embodiments, the arbitration will consider some measure of user behavior with respect to the competing ads (also referred to as an ad "performance parameter"). If so, the user behavior estimate is needed. However, in embodiments in which the arbitration does not need to consider any measure of user behavior with respect to the competing ads, the user behavior estimate is not needed and block 530 need not be performed. In any event, the determined composite price and presentation attribute information is made available for rendering to a system user, such as an advertiser (Block 550), before the method 500 is left (Node 560).

§4.2.2 Inventory Estimation

Figure 6:
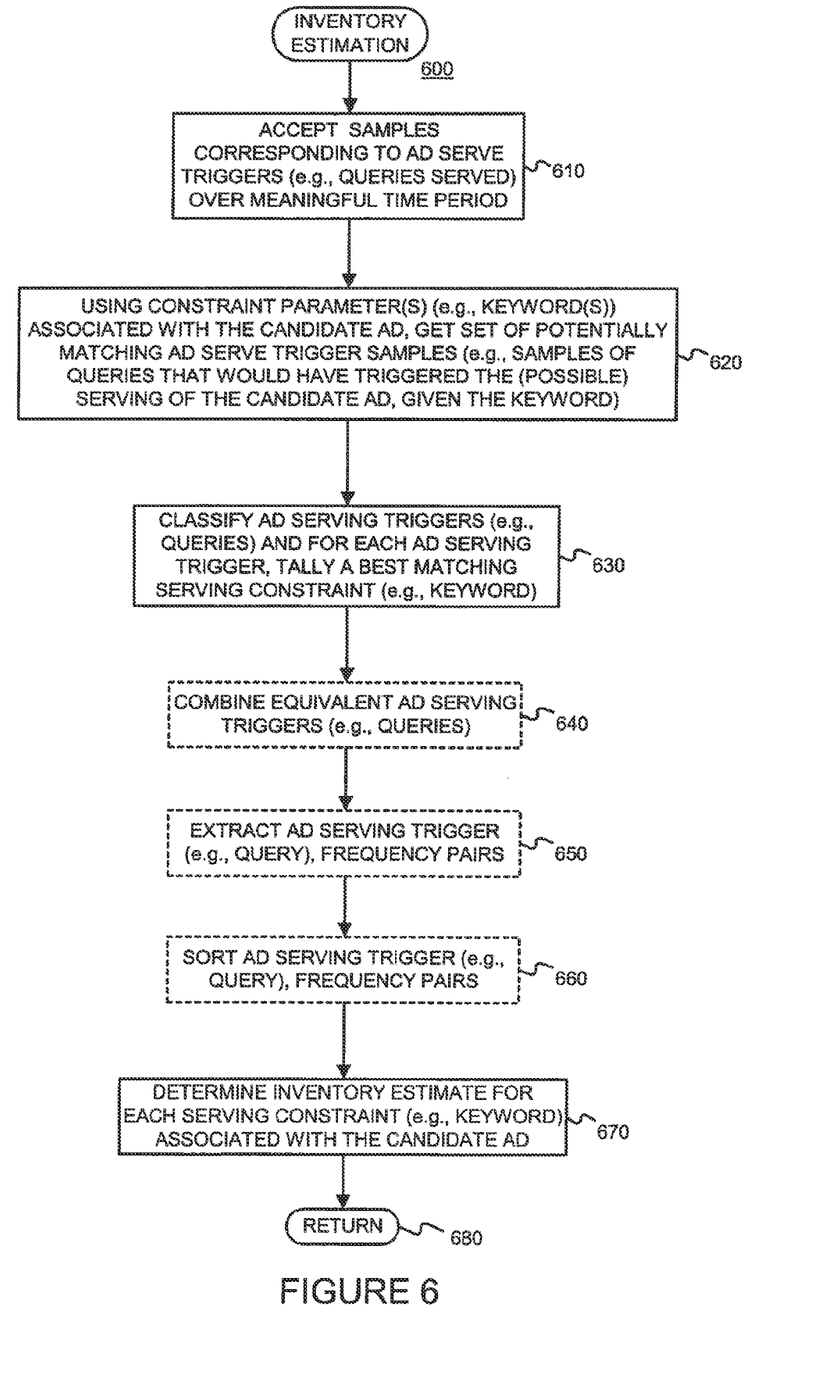
FIG. 6 is a flow diagram of an exemplary inventory estimation method that may be used to estimate inventory in a manner consistent with the present invention.

FIG. 6 is a flow diagram of an exemplary inventory estimation method 600 that may be used to estimate inventory in a manner consistent with the present invention. Other methods are possible.

Referring to FIG. 6, samples corresponding to past ad serve triggers (e.g., search queries served) over a meaningful period are accepted. (Block 610) Using a constraint parameter(s) (e.g., keyword(s)) associated with the candidate ad, a set of potentially matching ad serve trigger samples is obtained. (Block 620) In the context of an exemplary system in which ads with associated keywords are served when the keywords correspond to a search query, these samples correspond to samples of queries that would have triggered the (possible, subject to arbitration) serving of the candidate ad, given the keyword. The ad serving triggers (e.g., queries) are then classified, and for each ad serving trigger, a best matching serving constraint (e.g., keyword) is tallied. (Block 630) Equivalent ad serving triggers (e.g., query samples) may be combined. (Block 640) Ad serving trigger (e.g., query), frequency pairs may then be extracted. (Block 650) The ad serving trigger (e.g., query), frequency pairs may then be sorted. (Block 660) Finally, an inventory estimate for each serving constraint (e.g., keyword) associated with the candidate ad may be determined (Block 670) before the method 600 is left (Node 680).

§4.2.2.1 Exemplary Inventory Prediction in an Advertising System Using Keyword-Search query relationships (e.g., Matches) as Ad Serve Triggers Available daily inventory for a given keyword (i.e., how many search queries will trigger an ad for this keyword given its match type (broad, phrase, or exact) and any geo or language targeting associated with the campaign) may be determined (Recall block 520 of FIG. 5.). For example, if the campaign is targeted to the U.S. and to all languages, then a search for "cheap web hosting" from within the U.S. will trigger the keyword "web hosting" provided it is a broad match or a phrase match. Thus, how many queries with the qualifying properties will be served by a search engine on average in a single day is determined. This then equals the available number of impressions for the candidate ad having the keyword in question.

A recently collected, random sample of queries served over the course of a few weeks may be used. (Recall, e.g., Block 610 of FIG. 6.) This sample, usually (if somewhat inaccurately) referred to as the query log (which may be included as usage information 320), is made to accurately reflect the relative frequencies of different queries, from different originating countries, and so on, in search engine traffic. The length of the sample period should be chosen to eliminate traffic variations caused by weekends, holidays, or other temporary factors. The sample size may be on the order of 100 million queries.

Referring to FIG. 3, to allow fast lookups into the query log, ad serving trigger (e.g., query) indexing operations 330 may be used to generate an index 335. The index should be rebuilt every time the sample is updated. (In fact, several indices may be used, as will be discussed below.) The index 335 allows lookup of a single word (as opposed to keyword, which may consist of several words) to find all queries containing that word, in constant (i.e., as opposed to polynomial or exponential) time. The list of such queries is referred to as a "match list."

To find all potential matches for a given keyword (Recall, e.g., block 620 of FIG. 6.), the keyword may be divided into its individual words. The match list for each word may then be obtained from the index. The shortest match list (i.e., the one for the least commonly occurring word) is selected. This is because a query which does not contain the word corresponding to the shortest match list cannot possibly be a match in one embodiment.

The queries in this shortest match list are still only potential matches—they might not contain the entire keyword, might not respect its match type, and might not respect geo or language targeting (or some other serving constraints). To determine which queries are actual matches, a query classifier may be used. (Recall, e.g., block 630 of FIG. 6.) More specifically, for each request (to analyze a candidate ad), the query classifier is initialized with the serving constraints (e.g., targeting) specified by the request. In this example, the serving constraints include the set of keywords plus additional targeting. Each potentially matching query is then run through the classifier and tallied to the keyword it matches, subject to the further serving constraints (if any). Note that if broad matching is used, a query may match more than one keyword. In such a case, the query should be tallied to the most specific keyword so that the impression is only counted once. (The specificity of a keyword may be determined by its match type and the number of words in it.) Note also that the serving constraints may include negative keywords. Any query that includes a negative keyword will be removed from consideration.

The outcome of this process is, for each keyword, a list of matching queries. (Recall, e.g., information 350 of FIG. 3.) The size of each list, referred to as the "hit count," can now be used to compute an inventory estimate for the corresponding keyword. (Recall, e.g., block 670 of FIG. 6.) The estimated daily number of impressions may be defined as:

hit count*current daily traffic size/sample size.

As shown in FIGS. 3 and 4, the lists of matching queries may also be used for arbitration simulation and/or generation of keyword suggestions.

A number of refinements to the present invention may be used to speed up these processes. For example, in one refined embodiment, equivalent queries are represented only once in any one list, by a token query (which could be any one of the equivalent queries) together with the number of queries it stands in for. (See, e.g., optional block 640 of FIG. 6.) In one embodiment, two queries are considered equivalent if they would always trigger the same set of ads (which means they are equivalent for arbitration (e.g., auction) simulation purposes) and if the normalized query strings are the same (which means they are equivalent for keyword suggestion purposes).

In one embodiment, to determine equivalency, a query hash is computed by adding a hash of the query string to a hash of the criteria set produced by the classifier. As queries get classified and tallied, a hash map is built for each keyword, mapping query hashes to the number of times queries of the corresponding equivalence classes has been tallied. This count can, in fact, be different for different keywords, since different query samples may have been used (as discussed below).

Once all queries have been classified, the final lists of (query, frequency) pairs may be extracted and sorted in order of decreasing frequency. (See, e.g., block 650 of FIG. 6.) This sorted list will useful in the context of arbitration simulation, as will be described in §4.2.4 below.

Unfortunately, for a common keyword, the match list may be so long that it takes an unreasonable amount of time to classify all of its queries. At the same time, the query sample should be large enough to ensure statistical accuracy even for relatively rare keywords. Accordingly, in another refined embodiment of the present invention, not just one, but several query samples, each with its own index, are used. In this way, the match lists for common keywords can be obtained from the smaller samples, and match lists for less common keywords can be obtained from larger samples. One way of generating such "scoped" sample sets is to sub-sample the original (large) sample several times to produce a predetermined number of (e.g., around ten) sample sets of decreasing size. At request serving time, an appropriate sample size is picked for each keyword. Such an appropriate size may be determined through a process that considers all keywords at once, governed by two parameters—the minimum number of actual matches (k) desired for each keyword, and the total number of potential matches (N) to be considered (for example, to enforce an upper bound on the time spent in this step).

The refined method may consider the sample sets one by one, in order of increasing size. For each keyword, it first queries the current index for the number of potential matches (a constant-time operation). This number is then multiplied by a "match ratio" (described below). If the result is greater than k, there is reason to believe that enough actual matches for this keyword will be in the current sample set. The decision is then to fetch and classify all the queries in the match list. If, after doing so, the number of actual matches also turns out to be greater than k, the processing for this keyword is done. If not, the match ratio is recomputed to be (number of actual matches/number of potential matches), and the next larger sample set is tried. Either way, the total number of queries classified so far (n) is incremented.

If, on the other hand, (number of potential matches*match ratio<k), then the current index is simply skipped right away for that keyword. Of course, any upper bounds (N) should be respected. Accordingly, an index should not be skipped without first looking ahead at the next one. If the number of potential matches in next sample+n>N, then queries for the keyword in question are fetched from the current sample and then the processing stops, even though this means the desired k matches for that keyword might not be considered. For other keywords, of course, the larger sample sets may be used.

§4.2.3 User Behavior (Clickthrough) Estimation

In one embodiment, the advertiser pays an ad serving entity per click. In this case, the present invention may be used to determine a daily (or some other time period) number of clicks. To do so, a clickthrough rate may be estimated and applied to the estimated number of impressions to obtain an estimated number of clickthroughs.

Figure 7:
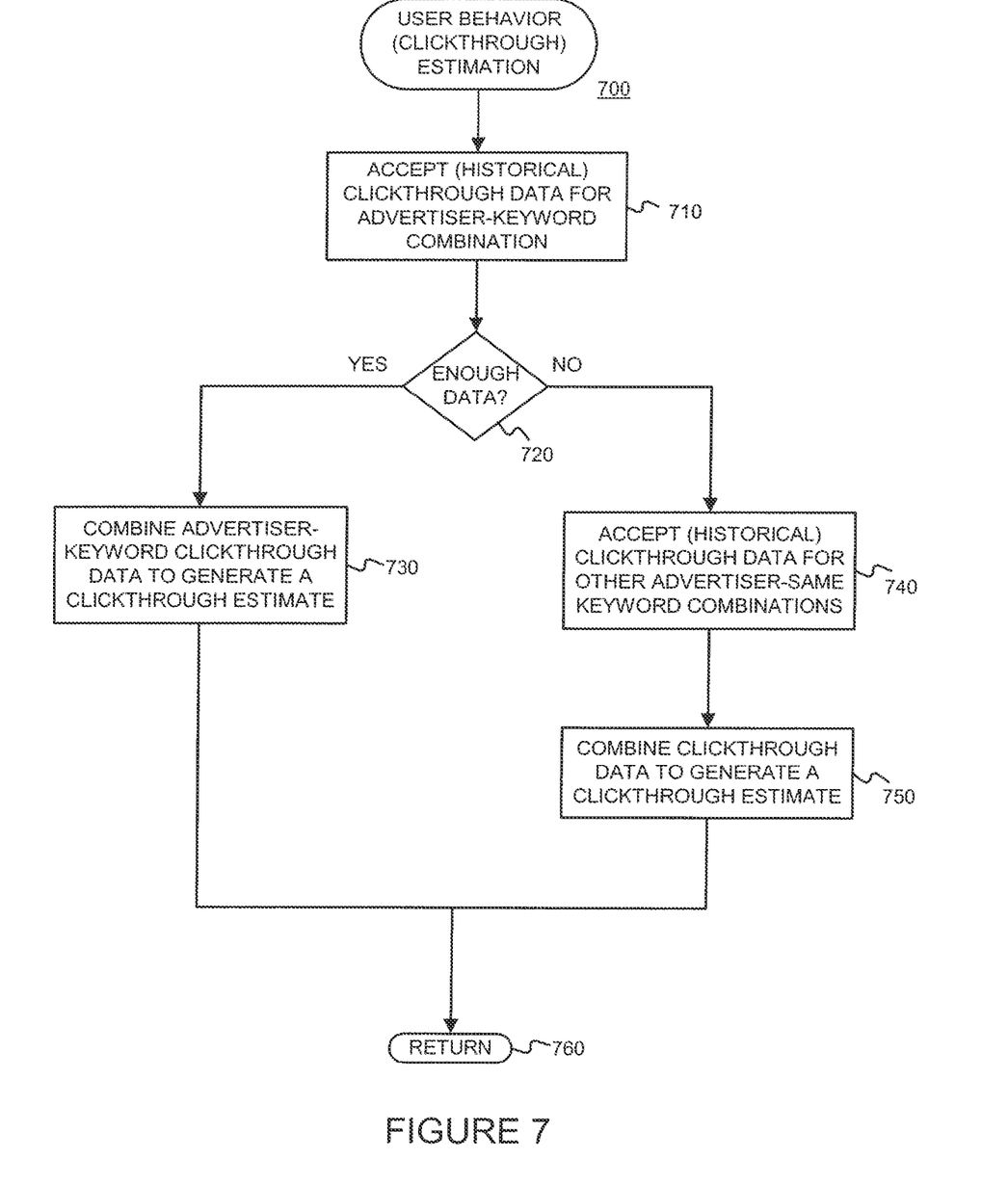
FIG. 7 is a flow diagram of an exemplary user behavior estimation method that may be used to estimate user behavior in a manner consistent with the present invention.

FIG. 7 is a flow diagram of a user behavior estimation method 700 that may be used to estimate user behavior (e.g., clickthrough) in a manner consistent with the present invention. Clickthrough data, such as stored historical data for example, for the advertiser-keyword combination is accepted. (Block 710) It is determined whether or not there is enough (e.g., a statistically significant amount of) data to determine a meaningful estimate. (Decision block 720) If there is enough data, the advertiser-keyword clickthrough data is combined to generate a clickthrough estimate (Block 730) before the method 700 is left (Node 760). If, on the other hand, there is not enough data, clickthrough data for other advertiser-same keyword combinations is accepted. (Block 740) The clickthrough data (of the advertiser-keyword, if any, and the other advertiser-same keyword) is combined to generate a clickthrough estimate. (Block 750) before the method is left (Node 760). If there is any clickthrough data for the given advertiser, it may be weighted more heavily than that from other advertisers. In any event, clickthrough data may be weighted more heavily if it is based on more impressions.

Referring back to blocks 730 and 750, there are many ways of combining the clickthrough data (or some other user behavior data) to get a clickthrough estimate. For example, the techniques described in provisional patent application Ser. No. 60/439,361, entitled "ESTIMATING CLICK-THROUGH RATES," filed on Jan. 10, 2003 and listing Eric Veach as the inventor, or in the utility patent application Ser. No. 10/350,910, entitled "ESTIMATING USER BEHAVIOR AND USING SUCH ESTIMATES," filed concurrently with the present application and listing Eric Veach as the inventor, may be used. These applications are incorporated herein by reference.

The historical performance statistics for the advertiser-keyword combination are preferably refreshed periodically.

Recall from blocks 720 and 740, that if no data, or not enough data, is available, the performance of the ads of competing advertisers on the same keyword (or generalizations thereof) will be considered (e.g., weighted in). This ensures that even a new advertiser can get some idea of how their chosen keywords will perform, thereby enabling them to improve their ad campaign even before it starts running. However, if the clickthrough estimation technique is query-based (that is, if it computes clickthrough for a keyword only in the context of a particular query), this data is not directly derivable from the keyword. To obtain this data, a fake "clickthrough query" may be constructed for each keyword, the text of which is simply the text of the keyword. This clickthrough query may be used to get relevant competitor ads (i.e., ads that would be, or at least could be, served in response to the clickthrough query). The clickthrough estimate of these ads, referred to as the "canonical clickthrough," is then obtained. The canonical clickthrough for a keyword represents the clickthrough that would be estimated if a user were to search on the exact keyword text (or an equivalent variation).

Note further that while queries may have unique serving parameters (e.g., a country and language of origin), an ad campaign may be targeted (i.e., its serving may be constrained) to several or even all countries or languages. If click and impression statistics used for clickthrough estimation are not aggregated by country or language, the origin of a query may affect the clickthrough estimate for a keyword on which the system has little data, again because of variations in the competitor data used for such cases. In a refined embodiment of the present invention, clickthrough statistics are weighted by number of impressions for clickthrough estimation purposes. In this refined embodiment, eligible ads for more than one query (i.e., one per country-language pair) can be gathered, and estimates may be determined on the whole set (though double-counting of statistics should be avoided). This then yields a weighted average clickthrough over all countries and languages targeted by the campaign. In a further refinement of the present invention, to avoid having to generate an excessive number of queries in cases where there are many targets, only one query is constructed, but all country and language criteria are added in halfway through the classification process. The result is effectively the same as if the result of multiple queries were combined. An alternative would be to only construct clickthrough queries for country-language pairs that represent a significant portion of the total targeted search traffic.

Conceivably, the notion of canonical clickthrough can be avoided altogether, and instead an average could be determined based on the "real" queries found during the previous step. There are, however, some drawbacks to such an approach. In particular, it is desirable to be able to generate a clickthrough estimate even for keywords that have no measurable inventory (and hence no matching queries in the sample). Moreover, if the number of matches is small, the canonical clickthrough is likely to be a better and more stable estimate.

§4.2.4 Ad Arbitration (Auction) Simulation

Figure 8:
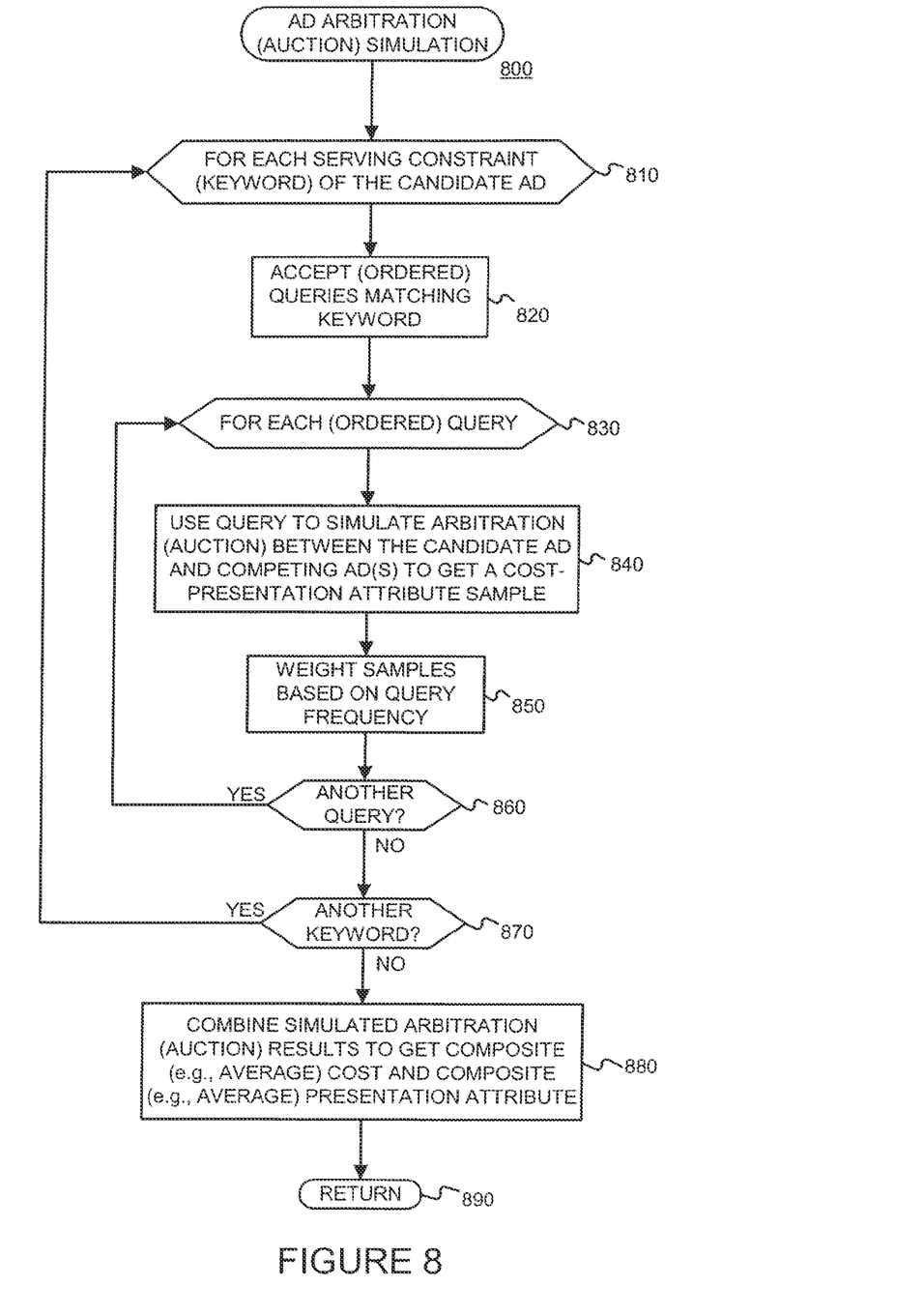
FIG. 8 is a flow diagram of an exemplary arbitration or auction simulation method that may be used to simulate an auction in a manner consistent with the present invention.

FIG. 8 is a flow diagram of an auction simulation method 800 that may be used to simulate an arbitration, such as an auction for example, between the candidate ad and competing ads, in a manner consistent with the present invention. As indicated by loop 810-870, a number of acts are performed for each keyword (or some other serving constraint) of the candidate ad. Queries relevant to (e.g., having some degree of match to) the keyword are accepted. (Block 820) Such queries may have been ordered. As indicated by loop 830-860, a number of acts are performed for each of the queries accepted. The query is used to simulate an arbitration (e.g., auction) between the candidate ad and one or more competing ads to get a cost sample, and a presentation attribute sample. (Block 840) The cost sample and the presentation attribute sample may then be weighted, based on a frequency of the query. (Block 850) As can be appreciated from the nested loops 830-860 and 810-870, a number of such weighted samples are obtained. The weighted samples are combined to get a composite (e.g., average) cost and a composite (e.g., average) presentation attribute for the candidate ad (Block 800), before the method 880 is left (Node 890).

Other ways of arbitrating the serving and/or presentation attributes of competing ads are possible. The present invention may be used in the context of such alternatives.

§4.2.4.1 Exemplary Auction Simulation in an Advertising System Using Keyword-Search query relationships (e.g., Matches) as Relevance Triggers, and Where the Auction Considers a Bid And Ad Performance Cost and presentation attribute estimates may be determined. (Recall, e.g., block 540 of FIG. 5.) In this exemplary embodiment, the cost estimate is a cost per result (e.g., a cost per click, cost per conversion, etc.), and the presentation attribute is a position. These estimates will depend on competing ads. Preferably, the estimates should reflect the state of the system at the time of the request. If this is to be the case, an up-to-date view of (e.g., all) relevant competing ads is needed. With this data, arbitrations may be simulated just as they would be carried out by an ad server. Accordingly, largely the same code may be used. In this example, the arbitration is an auction in which a price (e.g., a bid) and/or performance (e.g., estimate click-through) of the competing ads is used to determine their positions. See, for example, utility patent application Ser. No. 10/112,656, entitled "METHODS AND APPARATUS FOR ORDERING ADVERTISEMENTS BASED ON PERFORMANCE INFORMATION," filed on Mar. 29, 2002 and listing Jane Manning, Salar Arta Kamangar, Eric Veach and Lawrence E. Page as inventors, and utility patent application Ser. No. 10/112,654, entitled "METHODS AND APPARATUS FOR ORDERING ADVERTISEMENTS BASED ON PERFORMANCE INFORMATION AND PRICE INFORMATION," filed on Mar. 29, 2002 and listing Salar Arta Kamangar, Ross Koningstein and Eric Veach as inventors. Both of these applications are incorporated herein by reference.

In this particular embodiment, the results (a cost and a position) of a simulated auction for some query constitute a cost-position sample for a keyword triggered by that query. A number of cost-position samples for a keyword may be collected by simulating an auction for each query in the list of queries matching the keyword. (Recall, e.g., 350 of FIG. 3 and the nested loops of FIG. 8.). An average cost and an average position may be determined by weighting each sample by the relative frequency of the query. (Recall, e.g., block 860 of FIG. 8.) Assuming that the original query sample was fair, these estimates should be fair also (although if there is little data, their precision will be low).

Even if there is no query data for a keyword, a cost-position sample may be generated using the canonical query construct described in §4.2.3 above. If there are several such queries (with different source country and/or language), the resulting samples should be weighted by relative traffic size to arrive at a reasonable estimate. The main source of error when using canonical queries is that any additional competition on refinements of the keyword might not be taken into account. For example, if there are no competing advertisers having ads with the keyword "tennis," but several ads with the keyword "tennis shoes," a cost estimate based only on the canonical query for "tennis" will likely be too optimistic.

As noted above, the cost-position estimates are meant to be real-time. However, some fluctuations of a highly spurious nature should be corrected. In one embodiment of the invention, ads that have not yet been approved will not participate in the simulated auctions. Similarly, in one embodiment of the invention, ads that have not yet accrued enough impressions to know whether they will be allowed to run or not will not participate in the simulated auctions.

As a practical matter, some performance considerations may be necessary in some instances. For example, although running a single auction isn't very time-consuming, the total time can add up for requests with many keywords. (Recall, e.g., the nested loops of FIG. 8.) Accordingly, the number of queries for each keyword may be limited by a predetermined time constraint, although is might be desirable to process the keyword-query information in a different manner, as described later. Although, in theory, limiting the queries in this way could hurt the quality of the estimates (since they might not be based on a fair sample of queries), the situation is not so bad in many practical applications, and can be worked around. More specifically, for any keyword, the frequencies of its matching queries tend to decrease in an exponential fashion from the most common to the least common ones, which means that ignoring some of the "tail" on this exponential function will typically not affect the final result much. This fact may be exploited by processing queries in order of decreasing frequency. (Recall from block 660 of FIG. 6 that the keyword-query match lists may have been sorted in order of decreasing frequency). This fact may also be exploited by also attempting to process an equal fraction of matching queries for every keyword, thus ensuring that the quality of the estimates will be roughly the same for all keywords. This process is described in a bit more detail below.

Suppose that for keyword$_i$, there are a total number of $N_i$ matching queries available to be processed, but because of time constraints, only $n_i$ of them are actually processed. The total time for processing should be apportioned among the keywords such that $(n_i/N_i)$ is roughly the same for all i. To accomplish this, the time allocated to process queries associated with keyword, should be proportional to $N_i$ times the average processing time for a query matching this keyword. Unfortunately, the latter value is unknown—it depends, among other things, on the number of competing ads for the query. However, it may be estimated on the fly as $(t_i/n_i)$, where $t_i$ is the time spent to process the first $n_i$ queries. Some consideration then shows that a fair stopping criterion for keyword$_i$ is:

$$\frac{n_i}{N_i} > \frac{T}{\sum \frac{N_j \times t_j}{n_j}}$$

where T is the total time allowed for all keywords; or, equivalently, that the remaining number of queries for which there is time to process is:

$$\frac{N_i \times T}{\sum \frac{N_j \times t_j}{n_j}} - n_i$$

To use this criterion, the keywords cannot be processed one by one (as is the case in the loop 810-870 of FIG. 8). Instead, a few queries should be processed for keyword$_1$, then some for keyword$_2$, etc., and then loop to process more queries for each of the sequence of keywords. In one embodiment, the processing starts out by processing just one query per keyword (for each keyword), and then doubles the number queries per keyword processed on each successive iteration. Doing so exploits the fact that the $(t_i/n_i)$ estimate will improve as more queries are processed, thus allowing larger numbers of queries per keyword to be processed with confidence.

§4.2.5 Serving Constraint (Keyword) Suggestion

One embodiment of the invention generates two types of keyword suggestions—expansions and synonyms. To generate synonyms, keywords may simply be looked up in a synonym dictionary. The resulting list of synonyms may be filtered, for example, to avoid suggesting one of the original keywords, and then ordered by frequency (in case some synonyms appear for multiple keywords, which increases the likelihood that they are on-topic).

Keyword expansions, on the other hand, may be generated from the lists of matching queries (Recall, e.g., 350 of FIGS. 3 and 4.), which may have been produced by the inventory estimation operation. In one embodiment of the invention, each matching query must necessarily contain the keyword as a subset of the words it is made up of. It is thus a variation or expansion of the keyword. Moreover, the frequency of the query is an indicator of how common and useful the expansion is. A list of expansions sorted by decreasing frequency may be returned. As with synonyms, some filtering may be useful. For example, expansions that contain special search terms, that are too long compared to the original keyword (in number of words), or that appeared only once in the query sample, may be filtered out. The latter two situations suggest that the expansion is of a weird or random nature, and therefore probably not relevant.

§4.2.6 Miscellaneous Features

In addition to operations introduced and described above, the present invention may be used to return minimum prices of keywords, as enforced by an ad server, so that an advertiser can be notified if their bid is too low. The present invention may also be used to notify an advertiser if any keywords have been throttled (served less than normal) or disabled due to poor clickthrough performance. The present invention can also be used to compute a "target price"—namely, how much the advertiser has to pay to be in some specified position or better at least some specified fraction of the times the keyword is triggered. This feature may be provided as a part of the ad management interface operations to provide, among other things, budget recommendations.

§4.2.7 Exemplary Apparatus

Figure 9:
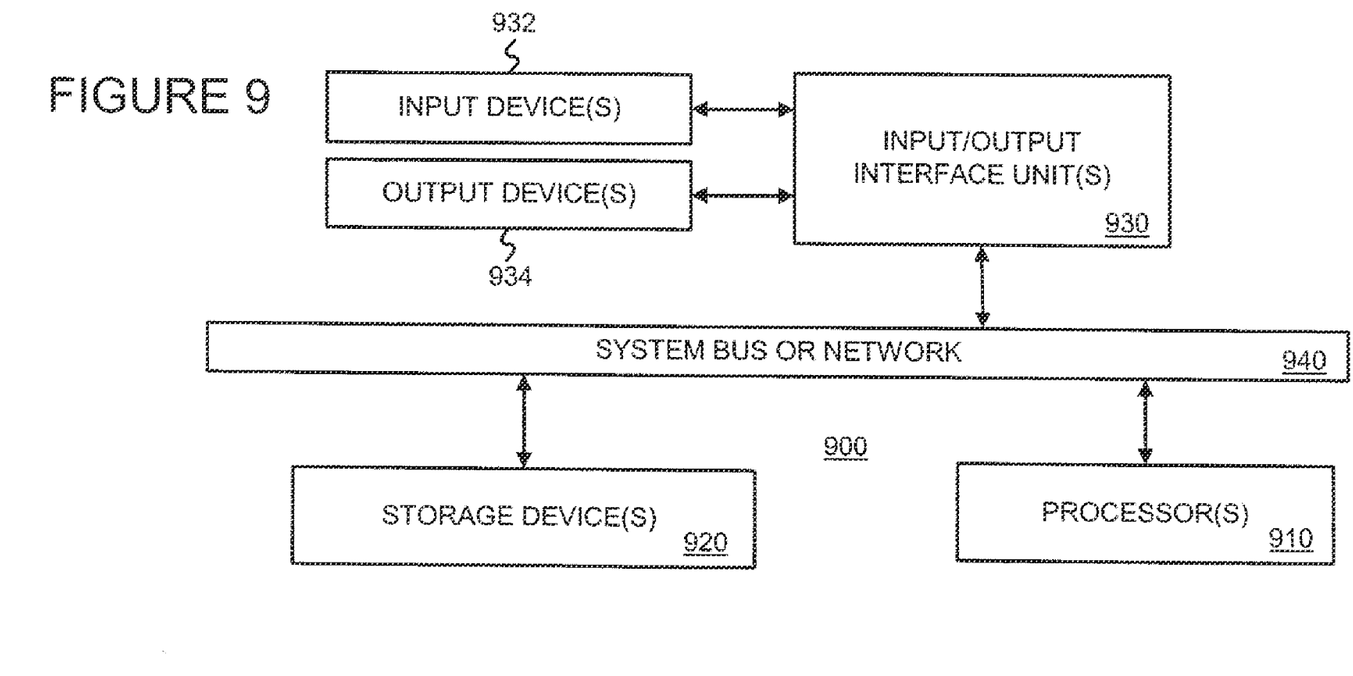
FIG. 9 is a high-level block diagram of apparatus that may be used to effect at least some of the various operations and store some of the various data structures in a manner consistent with the present invention.

FIG. 9 is high-level block diagram of a machine 900 that may effect one or more of the operations discussed above. The machine 900 basically includes a processor(s) 910, an input/output interface unit(s) 930, a storage device(s) 920, and a system bus or network 940 for facilitating the communication of information among the coupled elements. An input device(s) 932 and an output device(s) 934 may be coupled with the input/output interface(s) 930.

The processor(s) 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 920 and/or may be received from an external source via an input interface unit 930.

In one embodiment, the machine 900 may be one or more conventional personal computers. In this case, the processing unit(s) 910 may be one or more microprocessors. The bus 940 may include a system bus. The storage devices 920 may include system memory, such as read only memory (ROM) and/or random access memory (RAM). The storage device(s) 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. However, in the context of the accounting/billing operation(s) 225, no input devices, other than those needed to accept data, and possibly those for system administration and maintenance, are needed.

The output device(s) 934 may include a monitor or other type of display device, which may also be connected to the system bus 940 via an appropriate interface. In addition to (or instead of) the monitor, the personal computer may include other (peripheral) output devices (not shown), such as speakers and printers for example. Again, in the context of accounting/billing operation(s), no output devices, other than those needed to output billing information, and possibly those for system administration and maintenance, are needed.

§4.3 Conclusions

As can be appreciated from the foregoing disclosure, the present invention permits advertisers to predict costs and performance associated with one or more candidate ads.

What is claimed is:

1. A computer-implemented method, comprising:
receiving a candidate ad, the candidate ad associated with a plurality of keywords for triggering display of the candidate ad;
for each of the plurality of keywords, identifying a respective plurality of user queries that match the keyword according to respective matching criteria of the candidate ad; and
determining, by one or more processors, a cost estimate or presentation attribute for the candidate ad based on simulated auctions performed for a respective proportion of the respective plurality of user queries for each of the plurality of keywords, the simulated ad auctions being between the candidate ad and one or more competing ads, the respective proportion different from zero or unity.

2. The method of claim 1, wherein the respective proportion is substantially equal for each of the plurality of keywords.

3. The method of claim 1, further comprising:
for each of the plurality of keywords:
sorting the respective plurality of user queries identified for the keyword according to a respective query frequency associated with the user query; and
identifying the respective proportion of the respective plurality of user queries for the keyword from the sorted respective plurality of user queries identified for the keyword in an order of decreasing query frequency.

4. The method of claim 1, further comprising:
for each of the plurality of keywords:
determining that the respective proportion of the respective plurality of user queries for the keyword has been processed according to a stopping criterion:

$$\frac{n_i}{N_i} > \frac{T}{\sum_{all\ j} \frac{N_j \times t_j}{n_j}},$$

where $n_i$ is a count of the respective plurality of user queries that have been processed for keyword i, $N_i$ is a count of the respective plurality of user queries identified for the keyword i, T is a total processing time allotted for the plurality of keywords, $N_j$ is a count of the respective plurality of user queries identified for the keyword j, $n_j$ is a count of the respective plurality of user queries that have been processed for keyword j, $t_j$ is time spent to process the first $n_j$ user queries of the respective plurality of user queries identified for the keyword j.

5. The method of claim 1, wherein determining the cost estimate or presentation attribute for the candidate ad based on simulated auctions performed for the respective proportion of the respective plurality of user queries for each of the plurality of keywords further comprises:
processing the plurality of keywords independently of one another to obtain a cost or presentation attribute sample for the candidate ad, wherein processing each of the plurality of keywords including simulating auctions for the respective proportion of the respective plurality of user queries identified for the keyword.

6. The method of claim 1, wherein determining the cost estimate or presentation attribute for the candidate ad based simulated auctions performed for the respective proportion of the respective plurality of user queries for each of the plurality of keywords further comprises:
interlacing respective processing of each of the plurality of keywords in a plurality of iterations to obtain a cost or presentation attribute sample for the candidate ad, wherein in each iteration, an increasing number of user queries identified for each of the plurality of keywords are processed.

7. The method of claim 6, wherein a respective number of user queries processed for each keyword in each iteration doubles a respective number of user queries processed for the keyword in an immediately preceding iteration.

8. The method of claim 1, further comprising:
providing the cost estimate or presentation attribute for the candidate ad to a user through an ad management interface.

9. A computer-readable medium having instructions stored thereon, the instructions, when executed by one or more processors, cause the processors to perform operations comprising:
receiving a candidate ad, the candidate ad associated with a plurality of keywords for triggering display of the candidate ad;
for each of the plurality of keywords, identifying a respective plurality of user queries that match the keyword according to respective matching criteria of the candidate ad; and
determining, by one or more processors, a cost estimate or presentation attribute for the candidate ad based on simulated auctions performed for a respective proportion of the respective plurality of user queries for each of the plurality of keywords, the simulated ad auctions being between the candidate ad and one or more competing ads, the respective proportion different from zero or unity.

10. The computer-readable medium of claim 9, wherein the respective proportion is substantially equal for each of the plurality of keywords.

11. The computer-readable medium of claim 9, wherein the operations further comprise:
for each of the plurality of keywords:
sorting the respective plurality of user queries identified for the keyword according to a respective query frequency associated with the user query; and
identifying the respective proportion of the respective plurality of user queries for the keyword from the sorted respective plurality of user queries identified for the keyword in an order of decreasing query frequency.

12. The computer-readable medium of claim 9, wherein the operations further comprise:
for each of the plurality of keywords:

determining that the respective proportion of the respective plurality of user queries for the keyword has been processed according to a stopping criterion:

$$\frac{n_i}{N_i} > \frac{T}{\sum_{all\,j} \frac{N_j \times t_j}{n_j}},$$

where $n_i$ is a count of the respective plurality of user queries that have been processed for keyword i, $N_i$ is a count of the respective plurality of user queries identified for the keyword i, T is a total processing time allotted for the plurality of keywords, $N_j$ is a count of the respective plurality of user queries identified for the keyword j, $n_j$ is a count of the respective plurality of user queries that have been processed for keyword j, $t_j$ is time spent to process the first $n_j$ user queries of the respective plurality of user queries identified for the keyword j.

13. The computer-readable medium of claim 9, wherein determining the cost estimate or presentation attribute for the candidate ad based on simulated auctions performed for the respective proportion of the respective plurality of user queries for each of the plurality of keywords further comprises:
processing the plurality of keywords independently of one another to obtain a cost or presentation attribute sample for the candidate ad, wherein processing each of the plurality of keywords including simulating auctions for the respective proportion of the respective plurality of user queries identified for the keyword.

14. The computer-readable medium of claim 9, wherein determining the cost estimate or presentation attribute for the candidate ad based simulated auctions performed for the respective proportion of the respective plurality of user queries for each of the plurality of keywords further comprises:
interlacing respective processing of each of the plurality of keywords in a plurality of iterations to obtain a cost or presentation attribute sample for the candidate ad, wherein in each iteration, an increasing number of user queries identified for each of the plurality of keywords are processed.

15. The computer-readable medium of claim 14, wherein a respective number of user queries processed for each keyword in each iteration doubles a respective number of user queries processed for the keyword in an immediately preceding iteration.

16. The computer-readable medium of claim 9, wherein the operations further comprise:
providing the cost estimate or presentation attribute for the candidate ad to a user through an ad management interface.

17. A system, comprising:
one or more processors; and
memory having instructions stored thereon, the instructions, when executed by the one or more processors, cause the processors to perform operations comprising:
receiving a candidate ad, the candidate ad associated with a plurality of keywords for triggering display of the candidate ad;
for each of the plurality of keywords, identifying a respective plurality of user queries that match the keyword according to respective matching criteria of the candidate ad; and
determining, by one or more processors, a cost estimate or presentation attribute for the candidate ad based on simulated auctions performed for a respective proportion of the respective plurality of user queries for each of the plurality of keywords, the simulated ad auctions being between the candidate ad and one or more competing ads, the respective proportion different from zero or unity.

18. The system of claim 17, wherein the respective proportion is substantially equal for each of the plurality of keywords.

19. The system of claim 17, wherein the operations further comprise:
for each of the plurality of keywords:
sorting the respective plurality of user queries identified for the keyword according to a respective query frequency associated with the user query; and
identifying the respective proportion of the respective plurality of user queries for the keyword from the sorted respective plurality of user queries identified for the keyword in an order of decreasing query frequency.

20. The system of claim 17, wherein the operations further comprise:
for each of the plurality of keywords:
determining that the respective proportion of the respective plurality of user queries for the keyword has been processed according to a stopping criterion:

$$\frac{n_i}{N_i} > \frac{T}{\sum_{all\,j} \frac{N_j \times t_j}{n_j}},$$

where $n_i$ is a count of the respective plurality of user queries that have been processed for keyword i, $N_i$ is a count of the respective plurality of user queries identified for the keyword i, T is a total processing time allotted for the plurality of keywords, $N_j$ is a count of the respective plurality of user queries identified for the keyword j, $n_j$ is a count of the respective plurality of user queries that have been processed for keyword j, $t_j$ is time spent to process the first $n_j$ user queries of the respective plurality of user queries identified for the keyword j.

21. The system of claim 17, wherein determining the cost estimate or presentation attribute for the candidate ad based on simulated auctions performed for the respective proportion of the respective plurality of user queries for each of the plurality of keywords further comprises:
processing the plurality of keywords independently of one another to obtain a cost or presentation attribute sample for the candidate ad, wherein processing each of the plurality of keywords including simulating auctions for the respective proportion of the respective plurality of user queries identified for the keyword.

22. The system of claim 17, wherein determining the cost estimate or presentation attribute for the candidate ad based simulated auctions performed for the respective proportion of the respective plurality of user queries for each of the plurality of keywords further comprises:
interlacing respective processing of each of the plurality of keywords in a plurality of iterations to obtain a cost or presentation attribute sample for the candidate ad, wherein in each iteration, an increasing number of user queries identified for each of the plurality of keywords are processed.

23. The system of claim 22, wherein a respective number of user queries processed for each keyword in each iteration doubles a respective number of user queries processed for the keyword in an immediately preceding iteration.

24. The system of claim 17, wherein the operations further comprise:

providing the cost estimate or presentation attribute for the candidate ad to a user through an ad management interface.

* * * * *